(12) United States Patent
Lorenz

(10) Patent No.: US 12,296,955 B2
(45) Date of Patent: May 13, 2025

(54) WING ASSEMBLY COMPRISING A FIRST HIGH-LIFT DEVICE AND A SECOND HIGH-LIFT DEVICE, WING, AND AIRCRAFT

(71) Applicant: Airbus Operations GmbH, Hamburg (DE)

(72) Inventor: Florian Lorenz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/448,799

(22) Filed: Aug. 11, 2023

(65) Prior Publication Data

US 2024/0051654 A1    Feb. 15, 2024

(30) Foreign Application Priority Data

Aug. 12, 2022 (EP) .................................. 22190113

(51) Int. Cl.
*B64C 9/20* (2006.01)
*B64C 13/28* (2006.01)

(52) U.S. Cl.
CPC ............ *B64C 9/20* (2013.01); *B64C 13/28* (2013.01)

(58) Field of Classification Search
CPC .... B64C 9/06; B64C 9/18; B64C 9/20; B64C 13/50
See application file for complete search history.

(56) References Cited

U.S. PATENT DOCUMENTS

| 2,137,879 A | 11/1938 | Ksoll | |
|---|---|---|---|
| 2,222,915 A | 11/1940 | Rebeski | |
| 3,985,319 A * | 10/1976 | Dean | B64C 9/16 244/216 |
| 4,448,375 A | 5/1984 | Herndon | |
| 4,702,442 A * | 10/1987 | Weiland | B64C 9/16 244/218 |
| 5,651,513 A * | 7/1997 | Arena | B64C 9/16 244/99.3 |
| 9,452,821 B2 * | 9/2016 | Aljets | B64C 13/28 |
| 11,505,304 B2 * | 11/2022 | Tsai | B64C 9/06 |
| 11,858,629 B2 * | 1/2024 | Foskey | B64C 9/16 |
| 2024/0051654 A1 * | 2/2024 | Lorenz | B64C 9/20 |

FOREIGN PATENT DOCUMENTS

CA    432339 A    1/1946

OTHER PUBLICATIONS

Extended European Search Report for EP22190113.5 mailed Jan. 27, 2023, 9 pages.

* cited by examiner

*Primary Examiner* — Brian M O'Hara
(74) *Attorney, Agent, or Firm* — Nixon & Vanderhye P.C.

(57) ABSTRACT

A wing assembly (5) including: a fixed wing portion (7), a first high-lift device (9), a first connecting assembly (19) which allows the first high-lift device (9) to move between a retracted position and an extended position, a second high-lift device (11), a second connecting assembly (21) which allows the second high-lift device (11) to move between a retracted position and an extended position, a drive unit (23) attached to the fixed wing portion (7), and a drive assembly (25) having a first portion (27) is attached to the drive unit (23) and a second portion (29) attached to the second high-lift device (11), wherein the drive unit (23) moves the second high-lift device (11) via the drive assembly (25) between the retracted position and the extended position.

17 Claims, 5 Drawing Sheets

WING ASSEMBLY COMPRISING A FIRST HIGH-LIFT DEVICE AND A SECOND HIGH-LIFT DEVICE, WING, AND AIRCRAFT

RELATED APPLICATION

This application incorporates by reference and claims priority to European Patent Application EP 22190113.5, filed Aug. 12, 2022.

TECHNICAL FIELD

The invention relates to a wing assembly on a wing for an aircraft.

BACKGROUND

Wing assemblies generally include a fixed wing portion, a high-lift device, a connecting assembly, and a drive unit. The connecting assembly movably connects the high-lift device to the fixed wing portion, such that the high-lift device is movable between a retracted position and at least one extended position. The drive unit is attached to the fixed wing portion and is adapted to drive movement of the high-lift device from the retracted position to the at least one extended position and from the at least one extended position to the retracted position. Known high-lift devices include for example flaps and slats.

SUMMARY

It is generally desirable to provide a lightweight wing to further increase the efficiency of the aircraft in operation and to increase the maneuverability of the aircraft. The invention disclosed herein may be applied to increase the efficiency of an aircraft in operation and to increase the maneuverability of the aircraft.

The invention may be embodied as a wing assembly comprising a fixed wing portion, a first high-lift device, a first connecting assembly, a second high-lift device, a second connecting assembly, a drive unit, and a drive assembly. The first connecting assembly movably connects the first high-lift device to the fixed wing portion, such that the first high-lift device is movable between a retracted position and at least one extended position. The second connecting assembly movably connects the second high-lift device to the first high-lift device, such that the second high-lift device is movable between a retracted position and at least one extended position. The drive unit is attached to the fixed wing portion. The drive assembly comprises a first portion, which is attached to the drive unit, and a second portion, which is attached to a portion of the second high-lift device. The drive unit is adapted to drive movement of the second high-lift device via the drive assembly from the retracted position to the at least one extended position and from the at least one extended position to the retracted position.

The first high-lift device may be a flap or a slat.

The second high-lift device may comprise further high-lift devices, such as a third high-lift device or a fourth high-lift device. The features, technical effects and/or advantages that will be described in connection with the second high-lift device also apply to the third high-lift device and to the fourth high-lift device at least in an analogous manner.

The drive unit may comprise a rotary drive unit, such as a linear drive unit, and further drive units, such as a second drive unit or a third drive unit. The features, technical effects and/or advantages that will be described in connection with the first drive unit also apply to the second drive unit and to the third drive unit at least in an analogous manner.

For each high-lift device, a corresponding drive unit is provided. For example, the drive unit or another drive unit, such as a second or third drive unit may be adapted to drive movement of the third high-lift device via the drive assembly or via another drive assembly from a retracted position to at least one extended position and from the at least one extended position to the retracted position. Further, for example, the drive unit or another drive unit, such as a third or fourth drive unit may be adapted to drive movement of the fourth high-lift device via the drive assembly or via another drive assembly from a retracted position to at least one extended position and from the at least one extended position to the retracted position.

The second connecting assembly may movably connect the second high-lift device to the first high-lift device, such that the second high-lift device is movable between the retracted position and the at least one extended position. The retracted position of the second high-lift device may be a retracted position with respect to the first high-lift device. Preferably the at least one extended position of the second high-lift device is an extended position with respect to the first high-lift device.

The drive unit may be attached to the fixed wing portion and be adapted to drive movement of the second high-lift device via the drive assembly from the retracted position to the at least one extended position and from the at least one extended position to the retracted position. This configuration has the benefit that there is no need to have devices transferring flexibly electrical or hydraulic power supply between the fixed wing portion and the second high-lift device, which may significantly reduce the weight of the wing. Further, the second high-lift device does not have to be penetrated by an actuator integration, which may significantly reduce the weight of the wing. Further, maintenance operations and access to the drive unit is much easier and smaller profile heights of the second high-lift device will be feasible. The second high-lift device of the wing assembly provides means for providing roll control, flutter control, and/or gust load alleviation. Thereby, the second high-lift device increases the maneuverability of the aircraft. In the case that the third high-lift device and/or the fourth high-lift device are provided, the third high-lift device and/or the fourth high-lift device also provide means for providing roll control, flutter control, and/or gust load alleviation. Thereby, the third high-lift device and/or the fourth high-lift device increase the maneuverability of the aircraft.

In summary, a wing assembly is disclosed herein that can be applied to increase the efficiency of an aircraft in operation and increase the maneuverability of the aircraft.

The wing assembly, the first connecting assembly and the drive assembly may form two separate structural components. When the first connecting assembly and the drive assembly form two separate structural components, a mechanically simple assembly can be chosen such as a combination of a strut and a hollow shaft.

The wing assembly, a portion of the first connecting assembly may be movably connected to a portion of the drive assembly. When a portion of the first connecting assembly is movably connected to a portion of the drive assembly relative motion of the first connecting assembly and the drive assembly with respect to each other is ensured.

The wing assembly may further comprise a bearing assembly arranged between the portion of the first connecting assembly and the portion of the drive assembly such that the portion of the first connecting assembly is movably connected to the portion of the drive assembly via the bearing assembly. The bearing assembly may provide a well-defined relative motion of the portion of the first connecting assembly and the portion of the drive assembly with respect to each other.

The first connecting assembly may comprise a strut which extends from a first end portion, at which the strut is attached to the fixed wing portion, to a second end portion, at which the strut is attached to a portion of the first high-lift device. Preferably, the strut is adapted to withstand compressive and tensile loads along the direction of extension from the first end portion to the second end portion and can therefore lock a degree of freedom between the fixed wing portion and the first high-lift device. Preferably, the strut can also be referred to as a lateral strut, especially if the strut locks a degree of freedom between the fixed wing portion and the first high-lift device along a lateral direction of the wing.

The drive assembly may comprise a hollow shaft, wherein the strut and the hollow shaft are arranged such that at least a portion of the strut is surrounded by at least a portion of the hollow shaft. If the strut and the hollow shaft are arranged such that at least a portion of the strut is surrounded by at least a portion of the hollow shaft, relative motion of the strut and the hollow shaft with respect to each other can be restrained to a desired motion in a technically simple way.

The wing assembly may further comprise a bearing assembly arranged between a portion of the strut and a portion of the hollow shaft such that the strut is movably connected to the hollow shaft via the bearing assembly. The bearing assembly provides a well-defined relative motion of the strut and the hollow shaft with respect to each other.

The bearing assembly may comprise a linear bearing such that the strut and the hollow shaft are linearly guided along a longitudinal axis of the strut with respect to each other. Preferably, the linear bearing comprises a first bearing portion and a second bearing portion, which are arranged spaced apart from each other along the longitudinal axis, which may ensure a mechanically robust assembly.

The bearing assembly may comprise a rotational bearing such that the strut and the hollow shaft are rotationally guided around a longitudinal axis of the strut with respect to each other. Preferably, the rotational bearing comprises a first bearing portion and a second bearing portion, which are arranged spaced apart from each other along the longitudinal axis, which ensures a mechanically robust assembly.

At least a portion of the first connecting assembly and at least a portion of the drive assembly together may form a single structural component. An advantage of a single structural component is that the assembly time can be significantly reduced, since only a single component needs to be mounted to the remaining portion of the wing.

The single structural component may comprise a load transferring portion, which extends from a first end portion, at which the load transferring portion is attached to the drive unit, along a longitudinal axis to a second end portion, at which the load transferring portion is attached to the first high-lift device, wherein the load transferring portion is adapted to transfer loads along the longitudinal axis. Preferably, the load transferring portion is attached to the fixed wing portion at the first end portion via a first bearing portion. It is further preferred that the load transferring portion is attached to the first high-lift device at the second end portion via a second bearing portion. Preferably, the load transferring portion is adapted to withstand compressive and tensile loads along the longitudinal axis of the load transferring portion and can therefore lock a degree of freedom between the fixed wing portion and the first high-lift device.

The load transferring portion can be arranged as a lateral strut. In this case the load transferring portion can function as a lateral strut and can therefore replace a lateral strut, since in this case the load transferring portion locks a degree of freedom between the fixed wing portion and the first high-lift device along a lateral direction of the wing.

The drive unit and the first end portion of the load transferring portion may be coupled to each other such that the drive unit can drive rotational movement of the load transferring portion around the longitudinal axis of the load transferring portion. The rotational movement of the load transferring portion ensures that a rotational movement of another component around the longitudinal axis can be driven by the drive unit via the load transferring portion. Therefore, the load transferring portion can, particularly in addition to transferring linear loads by withstanding compressive and tensile loads, drive rotational movement of another component around the longitudinal axis.

The second end portion of the load transferring portion may be attached to the second high-lift device. If the second end portion of the load transferring portion is attached to the second high-lift device, movement of the second high-lift device can be driven such that the second high-lift device moves from the retracted position to the at least one extended position and from the at least one extended position to the retracted position.

Further features, advantages and application possibilities of the present invention may be derived from the following description of exemplary embodiments and/or the figures. Thereby, all described and/or visually depicted features for themselves and/or in any combination may form an advantageous subject matter. Furthermore, in the figures, same reference signs may indicate same or similar objects.

DETAILED DESCRIPTION

Figure 1:
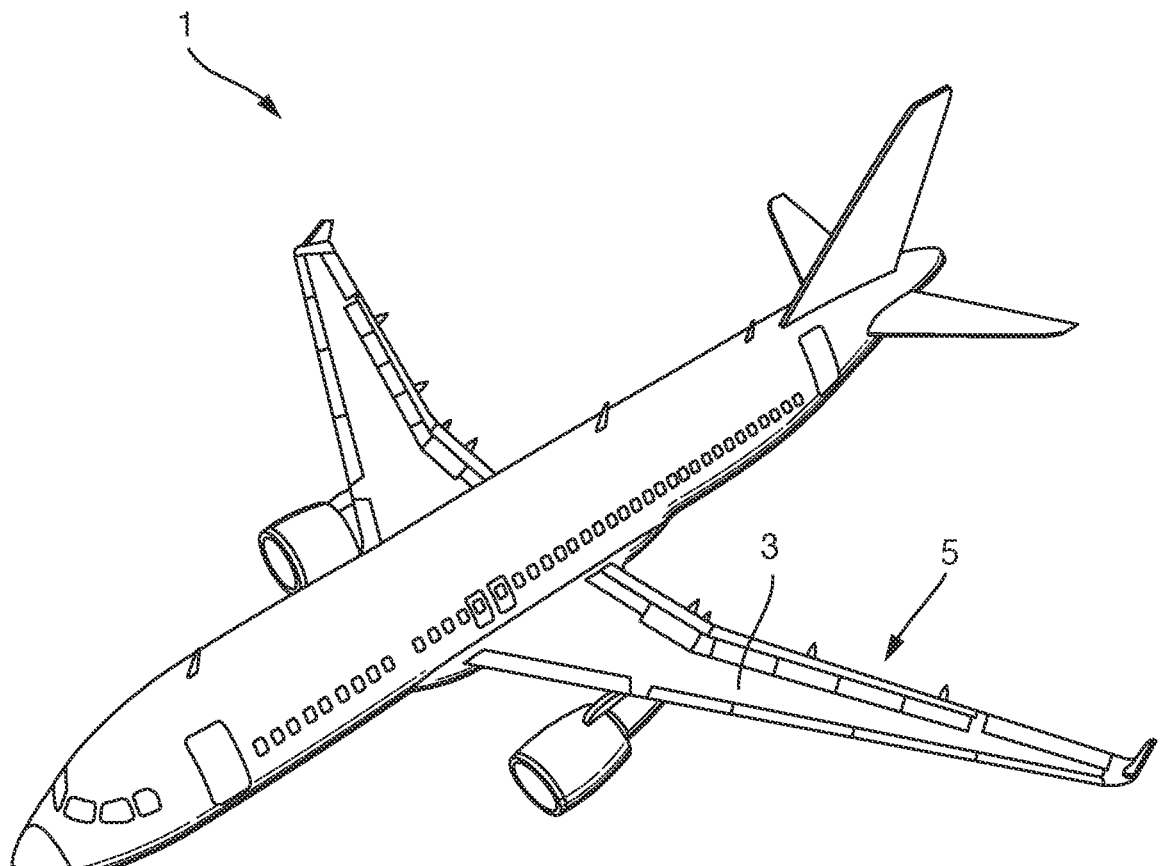
FIG. 1 schematically illustrates a perspective view of an aircraft.
Figure 2:
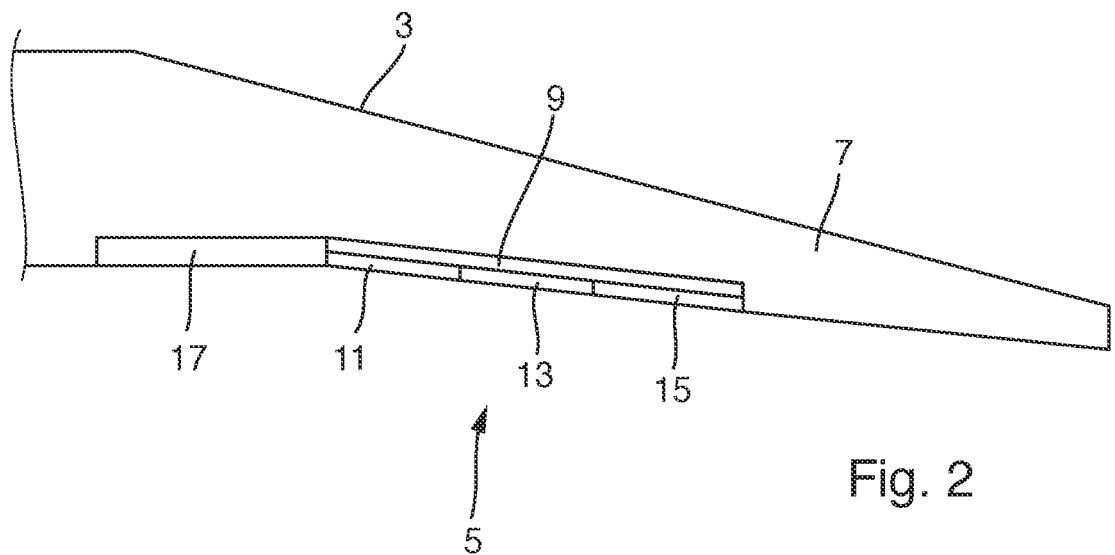
FIG. 2 schematically illustrates a portion of the wing comprising the wing assembly.
Figure 3:
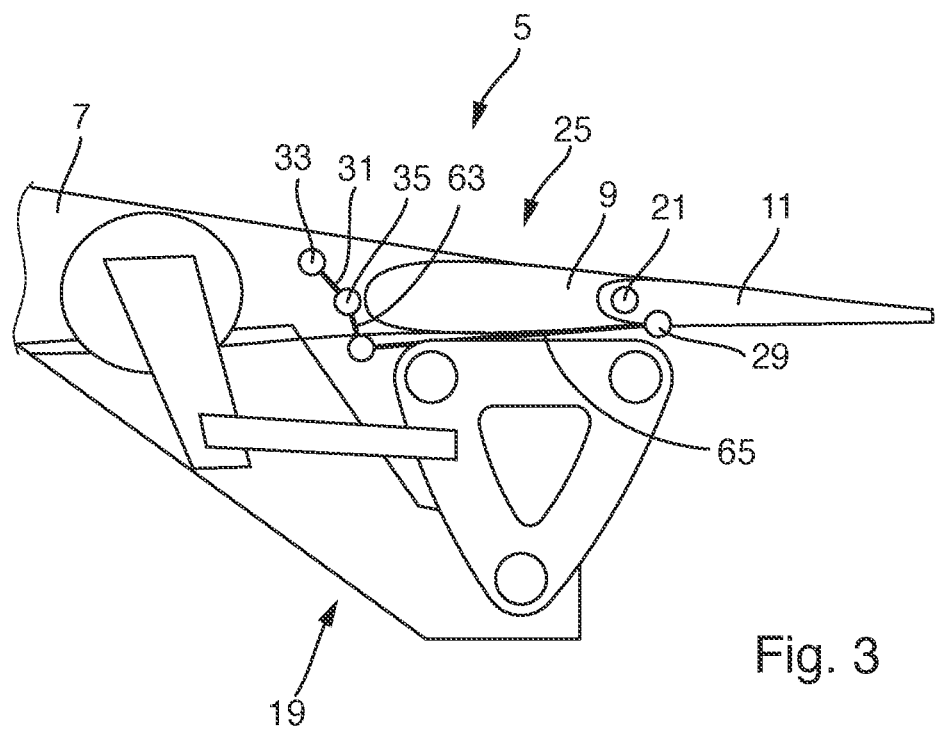
FIGS. 3 and 4 schematically illustrate a first embodiment of the wing assembly.
Figure 4:
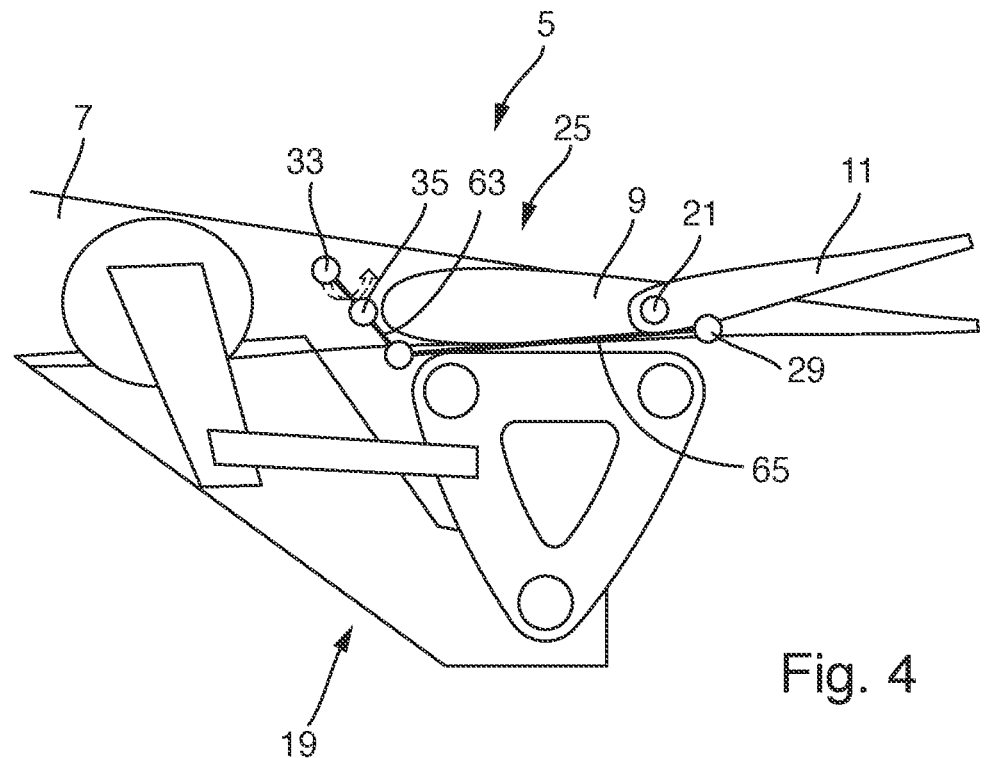
Figure 5:
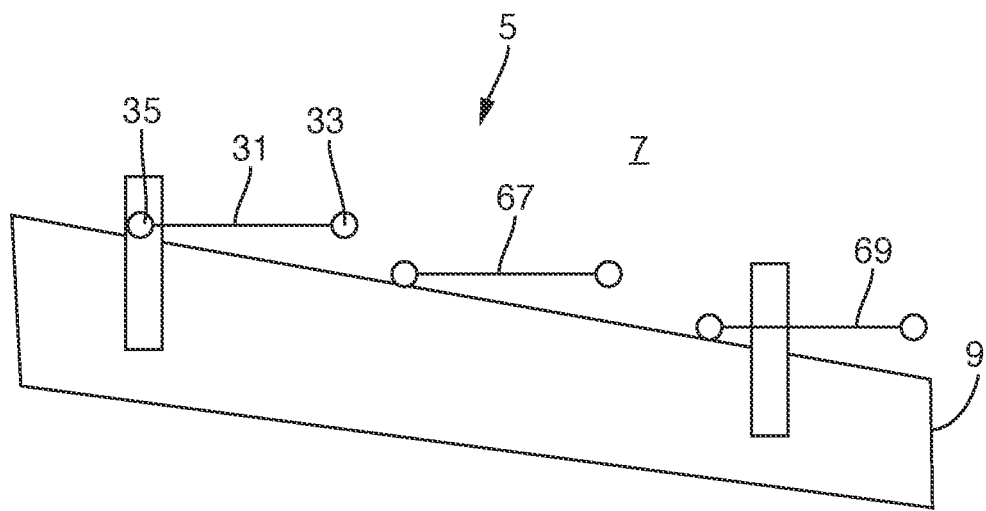
FIG. 5 schematically illustrates a portion of the wing and a portion of the first embodiment of the wing assembly.
Figure 6:
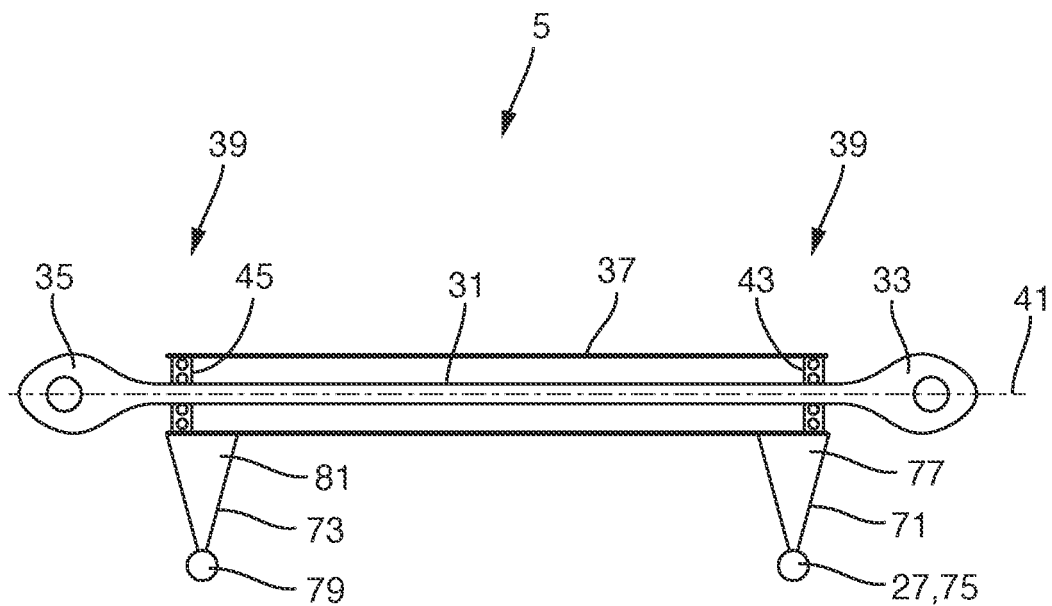
FIG. 6 schematically illustrates a portion of the first embodiment of the wing assembly.
Figure 7:
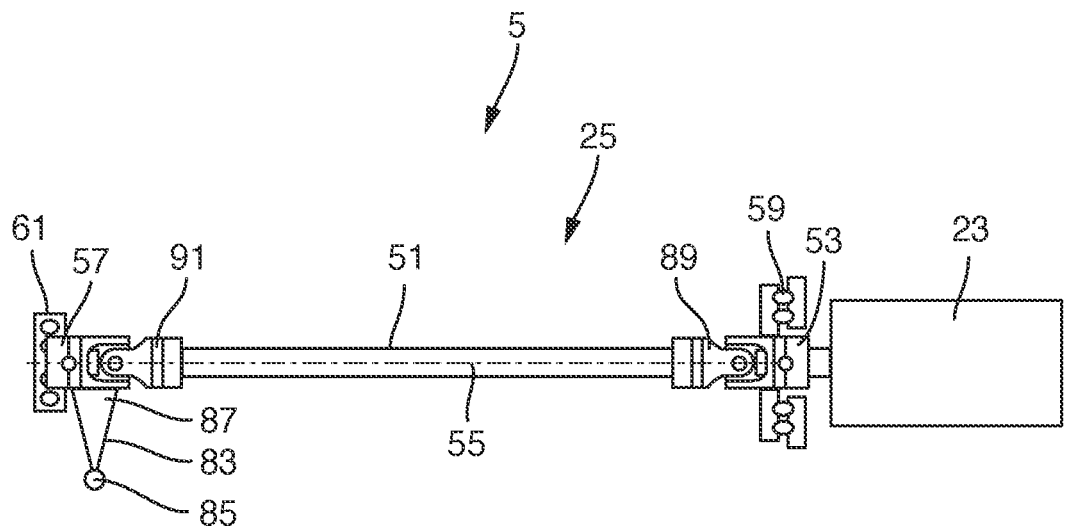
FIG. 7 schematically illustrates a portion of a second embodiment of the wing assembly.
Figure 8:
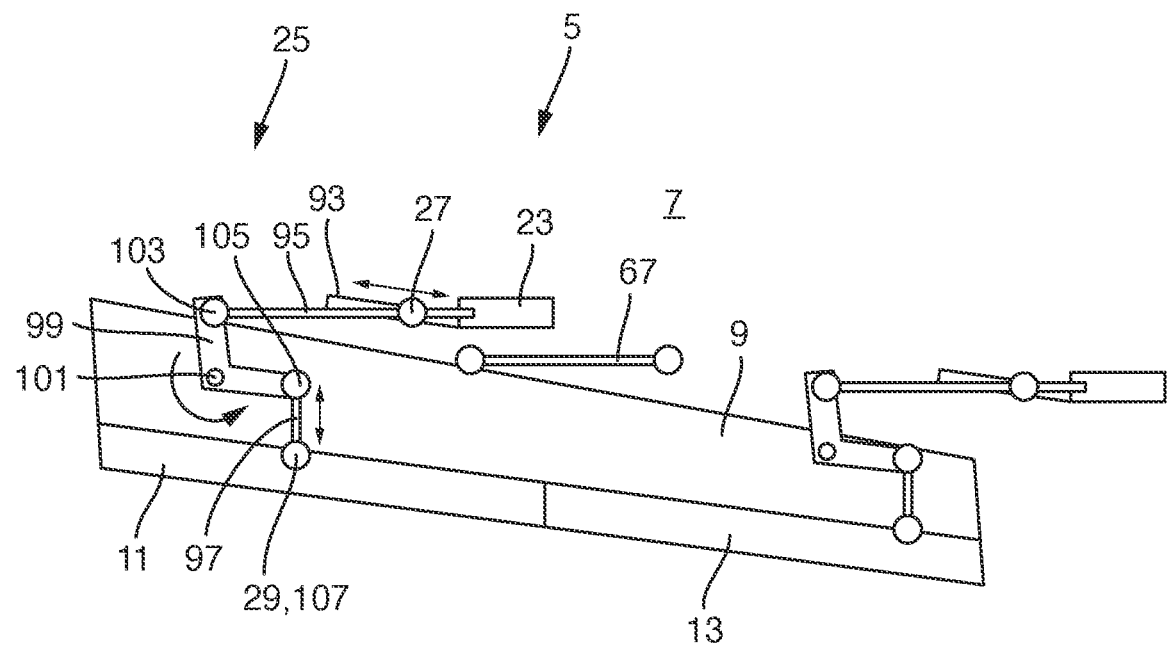
FIG. 8 schematically illustrates a portion of the wing and a portion of a third embodiment of the wing assembly.
Figure 9:
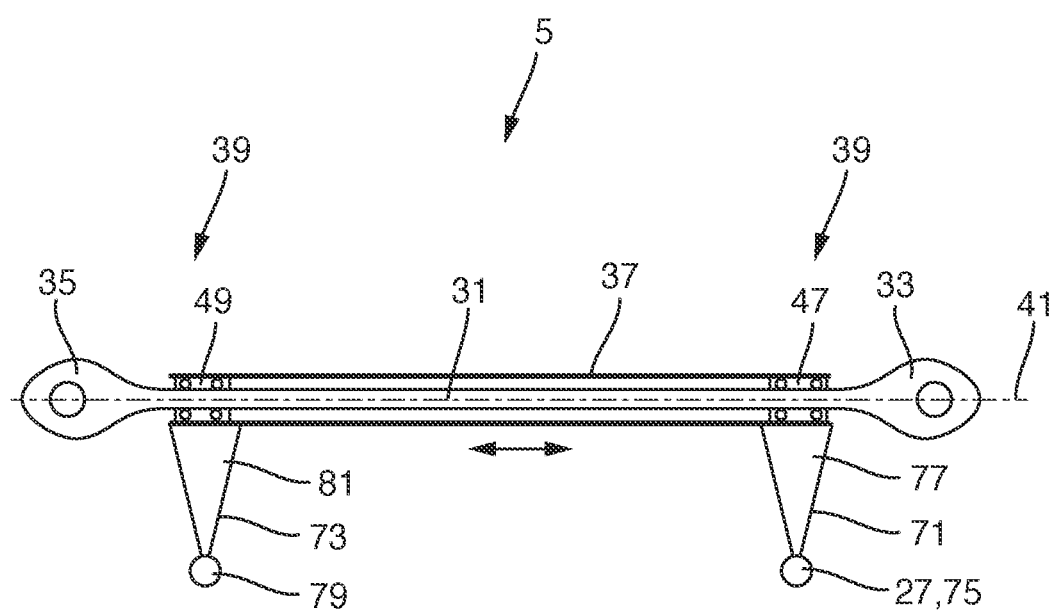
FIG. 9 schematically illustrates a portion of a fourth embodiment of the wing assembly.

FIG. 1 schematically illustrates an embodiment of an aircraft 1 comprising a wing 3. Wing 3 comprises wing assembly 5. FIG. 2 schematically illustrates a portion of wing 3 comprising wing assembly 5. FIGS. 3 and 4 schematically illustrate a first embodiment of the wing assembly 5. FIG. 5 schematically illustrates a portion of wing 3 and a portion of the first embodiment of the wing assembly 5. FIG. 6 schematically illustrates a portion of the first embodiment of wing assembly 5. FIG. 7 schematically illustrates a portion of a second embodiment of wing assembly 5. FIG. 8 schematically illustrates a portion of the wing 3 and a portion of a third embodiment of the wing assembly. FIG. 9 schematically illustrates a portion of a fourth embodiment of the wing assembly 5.

Wing assembly 5 comprises a fixed wing portion 7, a first high-lift device 9, a second high-lift device 11, a third high-lift device 13, a fourth high-lift device 15, and a fifth high-lift device 17. The features, technical effects and/or advantages that will be described in connection with the second high-lift device 11 also apply to the third high-lift device 13 and to the fourth high-lift device 15 at least in an analogous manner, so that no corresponding repetition is made. The wing assembly 5 further comprises a first connecting assembly 19.

The first connecting assembly 19 is adapted to movably connect the first high-lift device 9 to the fixed wing portion 7, such that the first high-lift device 9 is movable between a first retracted position and at least one first extended position. The wing assembly 5 comprises further a second connecting assembly 21. The second connecting assembly 21 is adapted to movably connect the second high-lift device 11 to the first high-lift device 9, such that the second high-lift device 11 is movable between a second retracted position shown in FIG. 3 and at least one second extended position shown in FIG. 4.

The wing assembly 5 further comprises a drive unit 23, an example of which is shown in FIG. 7. The drive unit 23 is attached to the fixed wing portion 7, such as being mounted to a strut of the fixed wing.

The wing assembly 5 further comprises a drive assembly 25. The drive assembly 25 comprises a first portion 27 and a second portion 29. The first portion 27 is attached to the drive unit 23. The second portion 29 is attached to a portion of the second high-lift device 11. The drive unit 23 is adapted to drive movement of the second high-lift device 11 via the drive assembly 25 from the retracted position to the at least one extended position and from the at least one extended position to the retracted position.

A particular advantage of the wing assembly 5 is that the drive unit 23 is attached to the fixed wing portion 7 and is also adapted to drive movement of the second high-lift device 11 via the drive assembly 25 from the second retracted position to the at least one second extended position and from the at least one second extended position to the second retracted position. This configuration has the benefit that there is no need to have devices transferring flexibly electrical or hydraulic power supply between the fixed wing portion 7 and the second high-lift device 11, which may significantly reduce the weight of the wing 3. Further, the second high-lift device 11 does not have to be penetrated by an actuator integration, which may significantly reduce the weight of the wing 3. Further, maintenance operations and access to the drive unit 23 is much easier and smaller profile heights of the second high-lift device will be feasible.

The second high-lift device 11, the third high-lift device 13, and the fourth high-lift device 15 of the wing assembly 5 provide means for providing roll control, flutter control, and/or gust load alleviation. Thereby, the second high-lift device 11, the third high-lift device 13, and the fourth high-lift device 15 increase the maneuverability of the aircraft. As already mentioned above, the features, technical effects and/or advantages that are described in connection with the second high-lift device 11 also apply to the third high-lift device 13 and to the fourth high-lift device 15 at least in an analogous manner. For example, the drive unit 23 or another drive unit may be adapted to drive movement of the third high-lift device 13 via the drive assembly 25 or via another drive assembly from a retracted position to at least one extended position 20 and from the at least one extended position to the retracted position. Further, for example, the drive unit 23 or another drive unit may be adapted to drive movement of the fourth high-lift device 15 via the drive assembly 25 or via another drive assembly from a retracted position to at least one extended position and from the at least one extended position to the retracted position.

The first connecting assembly 19 comprises a strut 31. The strut 31 extends from a first end portion 33, at which the strut 31 is attached to the fixed wing portion 7, to a second end portion 35, at which the strut 31 is attached to a portion of the first high-lift device 9. The strut 31 is adapted to withstand compressive and tensile loads along the direction of extension from the first end portion 33 to the second end portion 35 and can therefore lock a degree of freedom between the fixed wing portion 7 and the first high-lift device 9. When the strut 31 is arranged as shown, e.g., in FIG. 5, the strut 31 can also be referred to as a lateral strut 31, since the strut 31 locks a degree of freedom between the fixed wing portion 7 and the first high-lift device 9 along a lateral direction of the wing 3.

The drive assembly 25 of the first embodiment of the wing assembly 5 shown in FIG. 6 and the drive assembly 25 of the fourth embodiment of the wing assembly 5 shown in FIG. 9 each comprises a hollow shaft 37. The strut 31 and the hollow shaft 37 are arranged such that at least a portion of the strut 31 is surrounded by at least a portion of the hollow shaft 37. Since the strut 31 and the hollow shaft 37 are arranged such that at least a portion of the strut 31 is surrounded by at least a portion of the hollow shaft 37, relative motion of the strut 31 and the hollow shaft 37 with respect to each other can be restrained to a desired motion in a technically simple way.

As also shown in FIGS. 6 and 9, the first embodiment of the wing assembly 5 and the fourth embodiment of the wing assembly 5 further comprise a bearing assembly 39. The bearing assembly 39 is arranged between a portion of the strut 31 and a portion of the hollow shaft 37 such that the strut 31 is movably connected to the hollow shaft 37 via the bearing assembly 39. The bearing assembly 39 provides a well-defined relative motion of the strut 31 and the hollow shaft 37 with respect to each other. In the first embodiment of the wing assembly 5 shown in FIG. 6, the bearing assembly 39 comprises a rotational bearing such that the strut 31 and the hollow shaft 37 are rotationally guided around a longitudinal axis 41 of the strut 31 with respect to each other. The rotational bearing comprises a first bearing portion 43 and a second bearing portion 45, which are arranged spaced apart from each other along the longitudinal axis 41, which ensures a mechanically robust assembly. In the fourth embodiment of the wing assembly 5 shown in FIG. 9, the bearing assembly 39 comprises a linear bearing such that the strut 31 and the hollow shaft 37 are linearly guided along a longitudinal axis 41 of the strut 31 with respect to each other, which is indicated by a left right arrow. The linear bearing comprises a first bearing portion 47 and a second bearing portion 49, which are arranged spaced apart from each other along the longitudinal axis 41, which ensures a mechanically robust assembly.

The first embodiment of the wing assembly 5 shown in FIG. 6 and the fourth embodiment of the wing assembly 5 shown in FIG. 9 are examples in which the first connecting assembly 19 and the drive assembly 25 form two separate structural components. When the first connecting assembly 19 and the drive assembly 25 form two separate structural components, a mechanically simple assembly can be chosen such as the combination of a strut and a hollow shaft as described above. A portion of the first connecting assembly 19 is movably connected to a portion of the drive assembly 25, such that relative motion of the first connecting assembly 19 and the drive assembly 25 with respect to each other is ensured.

As has already been described with examples, a bearing assembly can be provided which is arranged between the portion of the first connecting assembly 19 and the portion of the drive assembly 25 such that the portion of the first connecting assembly 19 is movably connected to the portion of the drive assembly 25 via the bearing assembly. The bearing assembly provides a well-defined relative motion of the portion of the first connecting assembly 19 and the portion of the drive assembly 25 with respect to each other.

The second embodiment of the wing assembly 5, of which a portion is shown in FIG. 7 is an example in which at least a portion of the first connecting assembly 19 and at least a portion of the drive assembly 25 together form a single structural component. An advantage of a single structural component is that the assembly time can be significantly reduced, since only a single component needs to be mounted to the remaining portion of the wing 3. The single structural component comprises a load transferring portion 51. The load transferring portion 51 extends from a first end portion 53, at which the load transferring portion 51 is attached to the drive unit 23, along a longitudinal axis 55 to a second end portion 57, at which the load transferring portion 51 is attached to the first high-lift device 9. The load transferring portion 51 is attached to the fixed wing portion 7 at the first end portion 53 via a first bearing portion 59. The load transferring portion 51 is attached to the first high-lift device 9 at the second end portion 57 via a second bearing portion 61. The load transferring portion 51 is adapted to withstand compressive and tensile loads along the longitudinal axis 55 and can therefore lock a degree of freedom between the fixed wing portion 7 and the first high-lift device 9. The load transferring portion 51 can be arranged as the strut 31 is arranged as shown, e.g., in FIG. 5. In this case the load transferring portion 51 can function as a lateral strut and can therefore replace a lateral strut, since in this case the load transferring portion 51 locks a degree of freedom between the fixed wing portion 7 and the first high-lift device 9 along a lateral direction of the wing 3. The drive unit 23 and the first end portion 53 of the load transferring portion 51 are coupled to each other such that the drive unit 23 can drive rotational movement of the load transferring portion 51 around the longitudinal axis 55 of the load transferring portion 51. The rotational movement of the load transferring portion 51 ensures that a rotational movement of another component around the longitudinal axis 55 can be driven by the drive unit 23. Therefore, the load transferring portion 51 can, in addition to transferring linear loads by withstanding compressive and tensile loads, drive rotational movement of another component around the longitudinal axis 55. The second end portion 57 of the load transferring portion 51 is attached to the second high-lift device 11 and, thereby, movement of the second high-lift device 11 can be driven such that the second high-lift device 11 moves from the retracted position to the at least one extended position and from the at least one extended position to the retracted position.

Referring to FIGS. 3 and 4, the strut 31 is attached with its first end portion 33 to the fixed wing portion 7 via a spherical bearing and the strut 31 is attached with its second end portion 35 to the portion of the high-lift device 9 via a spherical bearing. The strut 31 of the first connecting assembly 19 is movably connected to a lever 63 of the drive assembly 25. Lever 63 is adapted to withstand compressive and tensile loads as well as bending loads. Lever 63 is attached with one end portion to the drive unit 23 and with the other end portion to a strut 65 of the drive assembly 25. The strut 65 is attached to a portion of the second high-lift device 11. Thereby, movement of the second high-lift device 11 can be driven from the retracted position shown in FIG. 3 to the at least one extended position shown in FIG. 4 and from the at least one extended position to the retracted position.

Referring to FIG. 5, the first connecting assembly 19 comprises a second strut 67 and a third strut 69. The features, technical effects and/or advantages described in connection with the strut 31 also apply to the second strut 67 and the third strut 69 at least in an analogous manner, so that no corresponding repetition is made here.

Referring to FIGS. 6 and 9, the hollow shaft 37 is attached to a first lever 71 and to a second lever 73, which are spaced apart from one another along the longitudinal axis 41. The first lever 71 is attached with a first end portion 75 to the drive unit 23 and with a second end portion 77 to a first end portion of the hollow shaft 37. The second lever 73 is attached with a first end portion 79 to the second high-lift device 11, e.g., via lever 63 and/or strut 65, and with a second end portion 81 to a second end portion of the hollow shaft 37. The first end portion and the second end portion of the hollow shaft 37 are spaced apart from one another along the longitudinal axis 41.

Referring to FIG. 7, the drive unit 23 is attached to the fixed wing portion 7 and a portion of the first bearing portion 59 is also attached to the fixed wing portion 7. A portion of the second bearing portion 61 is attached to the first high-lift device 9. A lever 83 is attached with a first end portion 85 to the second high-lift device 11, e.g., via lever 63 and/or strut 65, and with a second end portion 87 to the second end portion 57 of the load transferring portion 51. The load transferring portion 51 comprises a first universal joint assembly 89 at the first end portion 53 and a second universal joint assembly 91 at the second end portion 57. The first universal joint assembly 89 and the second universal joint assembly 91 provide a simple solution to ensure that movement of the second high-lift device 11 can be driven for different positions of the first high-lift device 9.

The wing assembly 5 disclosed in FIG. 8 is an example of a wing assembly 5 in which at least a portion of the first connecting assembly 19 and at least a portion of the drive assembly 25 together form a structural component assembly. The structural component assembly comprises a linear guide 93, which is attached to the fixed wing portion 7, a first strut 95, a second strut 97, and a linkage 99, which is pivotally attached to the first high-lift-device 9 at a first pivot point 101. A first end portion of the first strut 95 is driven by the drive unit 23 and linearly guided by the linear guide 93, which is indicated by a left right arrow. A second end portion of the first strut 95 is attached to a first end portion of the linkage 99 at a second pivot point 103 and a second end portion of the linkage 99 is attached to a first end portion of the second strut 97 at a third pivot point 105. A second end portion of the second strut 97 is attached to the second high-lift device 11 at a fourth pivot point 107.

It is additionally pointed out that "comprising" does not rule out other elements, and "a", "an" and "or" does not rule out a multiplicity. It is also pointed out that features that have been described with reference to one of the above exemplary embodiments may also be disclosed as in combination with

The invention claimed is:

1. A wing assembly comprising:
   a fixed wing portion,
   a first high-lift device,
   a first connecting assembly movably connecting the first high-lift device to the fixed wing portion, wherein the first high-lift device is movable between a first retracted position and at least one first extended position, and the first connecting assembly comprises a strut extending from a first end portion where the strut is attached to the fixed wing portion to a second end portion where the strut is attached to the first high-lift device,
   a second high-lift device,
   a second connecting assembly movably connecting the second high-lift device to the first high-lift device, wherein the second high-lift device is movable between a second retracted position and at least one second extended position,
   a drive unit attached to the fixed wing portion, and
   a drive assembly comprising a first portion attached to the drive unit and a second portion attached to a portion of the second high-lift device, wherein the drive assembly comprises a hollow shaft and at least a portion of the strut is surrounded by at least a portion of the hollow shaft,
   wherein the drive unit is adapted to drive movement of the second high lift device via the drive assembly from the second retracted position to the at least one second extended position and from the at least one second extended position to the second retracted position.

2. The wing assembly according to claim 1, wherein the first connecting assembly and the drive assembly form separate structural components.

3. The wing assembly according to claim 1, wherein a portion of the first connecting assembly is movably connected to a portion of the drive assembly.

4. The wing assembly according to claim 3, further comprising a bearing assembly arranged between the portion of the first connecting assembly and the portion of the drive assembly such that the portion of the first connecting assembly is movably connected to the portion of the drive assembly via the bearing assembly.

5. The wing assembly according to claim 1, further comprising a bearing assembly arranged between a portion of the strut and a portion of the hollow shaft such that the strut is movably connected to the hollow shaft via the bearing assembly.

6. The wing assembly according to claim 5, wherein the bearing assembly comprises a linear bearing and the strut and the hollow shaft are linearly guided along a longitudinal axis of the strut with respect to each other.

7. The wing assembly according to claim 5, wherein the bearing assembly comprises a rotational bearing and the strut and the hollow shaft are rotationally guided around a longitudinal axis of the strut with respect to each other.

8. The wing assembly according to claim 1, wherein at least a portion of the first connecting assembly and at least a portion of the drive assembly together form a single structural component.

9. The wing assembly according to claim 8, wherein the single structural component comprises a load transferring portion extending from a first end portion wherein the load transferring portion is attached to the drive unit, along a longitudinal axis to a second end portion wherein the load transferring portion is attached to the first high-lift device, and
   wherein the load transferring portion is adapted to transfer loads along the longitudinal axis.

10. The wing assembly according to claim 9, wherein the drive unit and the first end portion of the load transferring portion are coupled to each other, and
    the drive unit is configured to drive rotational movement of the load transferring portion around the longitudinal axis of the load transferring portion.

11. The wing assembly according to claim 9, wherein the second end portion of the load transferring portion is attached to the second high-lift device.

12. A wing comprising the wing assembly according to claim 1.

13. An aircraft comprising the wing according to claim 12.

14. A wing assembly comprising:
    a fixed wing,
    a first high-lift device,
    a first connecting assembly connecting the first high-lift device to the fixed wing portion and configured to guide the first high-lift device between a first retracted position and a first extended position, wherein the first connecting assembly comprises a strut includes a first end portion attached to the fixed wing portion and a second end portion attached to the first high-lift device,
    a second high-lift device,
    a second connecting assembly connecting the second high-lift device to the first high-lift device and configured to guide the second high-lift device between a second retracted position and at least one second extended position,
    a drive unit mounted to a spar of the fixed wing portion, and
    a drive assembly extending between the drive unit and the second high-lift device, wherein the drive unit is configured to drive the drive assembly to move the second high lift device between the second retracted position and the second extended position, wherein the drive assembly comprises a hollow shaft surrounding at least partially the strut.

15. The wing assembly according to claim 14, wherein the drive unit is a separate structural component to the first connecting assembly.

16. The wing assembly according to claim 14, further comprising a linear bearing between the strut and the hollow shaft, wherein the linear bearing guides relative movement of the strut and hollow shaft along a longitudinal axis of the strut.

17. The wing assembly according to claim 14, further comprising a rotational bearing between the strut and hollow shaft, wherein the rotational bearing guides relative rotational movement of the strut and the hollow shaft about a longitudinal axis of the strut.

* * * * *